United States Patent
Hwang (10) Patent No.: US 9,172,259 B2
(45) Date of Patent: Oct. 27, 2015

(54) APPARATUS FOR MANAGING BATTERY, AND ENERGY STORAGE SYSTEM

(71) Applicant: Samsung SDI Co., Ltd., Yongin-si, Gyeonggi-do (KR)

(72) Inventor: Eui-Jeong Hwang, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 197 days.

(21) Appl. No.: 13/959,620

(22) Filed: Aug. 5, 2013

(65) Prior Publication Data

US 2014/0145678 A1    May 29, 2014

Related U.S. Application Data

(60) Provisional application No. 61/731,410, filed on Nov. 29, 2012.

(51) Int. Cl.
*H02J 7/00* (2006.01)
*H02J 3/32* (2006.01)

(52) U.S. Cl.
CPC *H02J 7/0016* (2013.01); *H02J 3/32* (2013.01)

(58) Field of Classification Search
CPC .................................................. H02J 7/0052

USPC .................................................. 320/118, 119
See application file for complete search history.

(56) References Cited

U.S. PATENT DOCUMENTS

| | | | |
|---|---|---|---|
| 8,531,159 B2 * | 9/2013 | Tominaga | 320/136 |
| 8,566,049 B2 * | 10/2013 | Akahane et al. | 702/63 |
| 2011/0175574 A1 | 7/2011 | Sim et al. | |
| 2013/0090872 A1 * | 4/2013 | Kurimoto | 702/63 |

FOREIGN PATENT DOCUMENTS

| | | |
|---|---|---|
| KR | 10-2011-0013747 A | 2/2011 |
| KR | 10-2012-0030337 A | 3/2012 |
| WO | WO 2010/118039 A1 | 10/2010 |

* cited by examiner

*Primary Examiner* — Sun Lin
(74) *Attorney, Agent, or Firm* — Knobbe, Martens, Olson & Bear, LLP (57) ABSTRACT

A battery management system is disclosed. The system includes a controller configured to determine whether to balance battery cells or trays based at least in part on a parameter of each of the battery cells or trays and a factor representing a degree of use of each of the battery cells or trays. The controller also balances the battery cells or trays based on whether the battery cells are to be balanced.

20 Claims, 6 Drawing Sheets

APPARATUS FOR MANAGING BATTERY, AND ENERGY STORAGE SYSTEM

CROSS-REFERENCE TO RELATED APPLICATIONS

This application claims the benefit of U.S. Provisional Patent Application No. 61/731,410, filed on Nov. 29, 2012, in the United States Patent and Trademark Office, the disclosure of which is incorporated herein in its entirety by reference. Any and all priority claims identified in the Application Data Sheet, or any correction thereto, are hereby incorporated by reference under 37 CFR 1.57.

BACKGROUND

1. Field

The disclosed technology relates to a battery management apparatus and an energy storage system.

2. Description of the Related Technology

Environmental destruction and scarcity of natural resources are considered to be severe problems which increase the importance of a system capable of storing energy and efficiently using the stored energy. In addition, interest in new renewable energy sources which do not pollute while generating energy is also increasing. It is important to efficiently manage a battery in energy generation systems, energy storing battery systems, and energy storage systems for pre-existing systems. The efficient management of a battery may result in an increase in the life span of the battery and improved stability in the supply of electric power.

SUMMARY OF CERTAIN INVENTIVE ASPECTS

One inventive aspect is a battery management system. The system is configured to manage a battery including first and second battery cells, and includes a measurement circuit, configured to determine a parameter of each of the battery cells, and a controller configured to determine whether to balance the battery cells based at least in part on the determined parameter and a factor representing a degree of use of each of the battery cells. The controller is further configured to balance the battery cells based on whether the battery cells are to be balanced.

Another inventive aspect is a battery management system. The system is configured to manage a battery including first and second battery trays, and includes a measurement circuit, configured to determine a parameter of each of the battery trays, and a controller configured to determine whether to balance the battery trays based at least in part on the determined parameter and a factor representing a degree of use of each of the battery trays. The controller is further configured to balance the battery trays based on whether the battery trays are to be balanced.

BRIEF DESCRIPTION OF THE DRAWINGS

The above and other features and advantages and exemplary embodiments thereof are described below with reference to the attached drawings in which.

DETAILED DESCRIPTION OF CERTAIN INVENTIVE EMBODIMENTS

Certain advantages and features and certain aspects of methods of achieving the advantages and features are described with reference to the accompanying drawings, in which exemplary embodiments are shown. The invention may, however, be embodied in many different forms and should not be construed as being limited to the embodiments set forth herein.

The terminology used in the application is used only to describe the discussed embodiments and does not have any intention to limit the present invention. An expression in the singular includes an expression in the plural unless they are clearly different from each other in a context. In the application, it should be understood that terms, such as 'include' and 'have', are used to indicate the existence of a certain feature, number, step, operation, element, part, or a combination of them without excluding in advance the possibility of or addition of one or more other features, numbers, steps, operations, elements, parts, or combinations of them. Although terms, such as 'first' and 'second', can be used to describe various elements, the elements cannot be limited by the terms. The terms can be used to classify a certain element from another element.

Certain inventive aspects are described more fully with reference to the accompanying drawings, in which exemplary embodiments are shown. Like reference numerals in the drawings generally denote like elements, and thus, in some instances, their repeated description is omitted.

As used herein, the term "and/or" includes any and all combinations of one or more of the associated listed items. Expressions such as "at least one of," when preceding a list of elements, modify the entire list of elements and do not modify the individual elements of the list.

Figure 1:
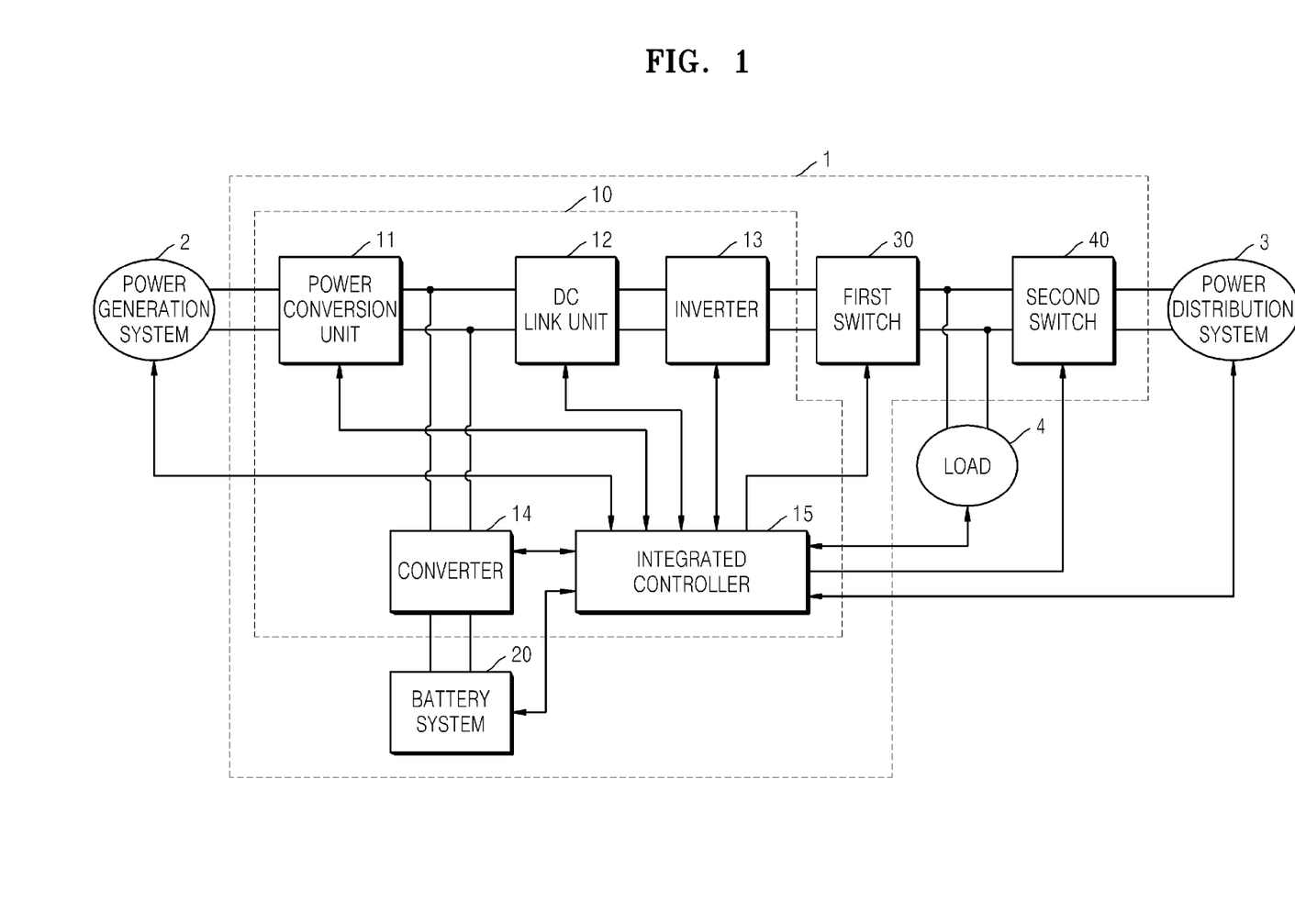
FIG. 1 is a block diagram of an energy storage system according to various embodiments.

FIG. 1 is a block diagram of an energy storage system 1 according to various embodiments. Referring to FIG. 1, the energy storage system 1 supplies electric power to a load 4 together with a power generation system 2 and a power distribution system 3.

The power generation system 2 is a system for generating electric power from an energy source. The power generation system 2 may supply the generated electric power to the energy storage system 1. The power generation system 2 may include at least one of for example, a solar power generation system, a wind power generation system, and a tidal power generation system. However, they are only illustrative, and the power generation system 2 is not limited thereto. For example, the power generation system 2 may include any type of power generation system for generating electric power, for example, by using a renewable energy source, such as solar heat and terrestrial heat. In particular, since a solar system for generating electric power from solar radiation can be easily mounted at various places, such as homes and factories, the solar system may be used together with the energy storage system 1 in each home or factory. The power generation system 2 may include a large-capacity energy system by using parallel arrangement of a plurality of power generation modules for generating electric power.

The power distribution system 3 may include a power generation plant, a power transmission plant, a power transmission line, and the like. When the power distribution system 3 is in a normal state, the power distribution system 3 may supply electric power to the energy storage system 1, for example, to at least one of the load 4 and a battery system 20, or receive electric power from the energy storage system 1, for example, from the battery system 20. When the power distribution system 3 is in an abnormal state, power transmission between the power distribution system 3 and the energy storage system 1 is cut off.

The load 4 may consume the electric power generated by the power generation system 2, the electric power stored in the battery system 20, or the electric power received from the power distribution system 3. Electric devices of homes and factories may be examples of the load 4.

The energy storage system 1 may supply the electric power generated by the power generation system 2 to the battery system 20 or to the power distribution system 3. The energy storage system 1 may supply the electric power stored in the battery system 20 to the power distribution system 3 or store the electric power received from the power distribution system 3 in the battery system 20. In addition, the energy storage system 1 may supply the electric power generated by the power generation system 2 or the electric power stored in the battery system 20 to the load 4. Furthermore, when the power distribution system 3 is in an abnormal state, for example, when a power failure occurs, the energy storage system 1 may function as an uninterruptible power supply (UPS) to supply the electric power generated by the power generation system 2 or the electric power stored in the battery system 20 to the load 4.

The energy storage system 1 may include a power conversion system (PCS) 10, the battery system 20, a first switch 30, and a second switch 40.

The PCS 10 may convert the electric power from the power generation system 2, the power distribution system 3, and the battery system 20 to provide power to the battery system 20, the load 4, or the power distribution system 3. The PCS 10 may include a power conversion unit 11, a direct current (DC) link unit 12, an inverter 13, a converter 14, and an integrated controller 15.

The power conversion unit 11 may be a power conversion device connected between the power generation system 2 and the DC link unit 12. The power conversion unit 11 may convert the electric power generated by the power generation system 2 so as to generate a DC link voltage and transmit the converted DC link voltage to the DC link unit 12.

The power conversion unit 11 may include a power conversion circuit, such as a converter circuit, a rectification circuit, or the like, according to the type of the power generation system 2. If the power generation system 2 generates DC power, the power conversion unit 11 may include a DC-DC converter circuit for converting the DC power generated by the power generation system 2 into DC power for the DC link unit 12. If the power generation system 2 generates alternate current (AC) power, the power conversion unit 11 may include a rectification circuit for converting the AC power into DC power.

If the power generation system 2 is a solar power generation system, the power conversion unit 11 may include a maximum power point tracking (MPPT) converter for performing an MPPT control to obtain maximum electric power generated by the power generation system 2 in correspondence with changes in solar radiation, temperature, and the like. In addition, if the power generation system 2 is not generating electric power, the power conversion unit 11 may be stopped to reduce power consumed by the power conversion unit 11.

The magnitude of the DC link voltage may be unstable due to an instantaneous voltage drop in the power generation system 2 or the power distribution system 3 or the occurrence of a sudden change in demand of the load 4. However, the DC link voltage is preferably stable for normal operation of the converter 14 and the inverter 13. In this embodiment, the DC link unit 12 is connected between the power conversion unit 11 and the inverter 13 to maintain the DC link voltage to be constant or substantially constant. In some embodiments, the DC link unit 12 includes a large-capacity capacitor.

In this embodiment, the inverter 13 is a power conversion device connected between the DC link unit 12 and the first switch 30. The inverter 13 may include an inverter for converting the DC link voltage output from at least one of the power generation system 2 and the battery system 20 into an AC voltage of the power distribution system 3. In addition, the inverter 13 may include a rectification circuit for converting an AC voltage input from the power distribution system 3 into a DC voltage for the DC link voltage to store electric power of the power distribution system 3 in the battery system 20 in a charge mode. The inverter 13 may be a bidirectional inverter capable of changing an input and output direction thereof.

The inverter 13 may include a filter for removing a harmonic components of the AC voltage to be output to the power distribution system 3. In addition, the inverter 13 may include a phase-locked loop (PLL) circuit for synchronizing the phase of the AC voltage output from the inverter 13 with the AC voltage of the power distribution system 3 to restrain or limit the generation of reactive electric power. In addition, the inverter 13 may function to limit a voltage fluctuation range, improve a power factor, remove a DC component, and protect or reduce transient phenomena.

The converter 14 may be a power conversion device connected between the DC link unit 12 and the battery system 20. The converter 14 may include a DC-DC converter for converting the DC level of the electric power stored in the battery system 20 into a DC link voltage. In addition, the converter 14 may include a DC-DC converter for converting the DC level of the voltage of the electric power output from the power conversion unit 11 or the electric power output from the inverter 13 into a voltage of a proper voltage level for charging the battery system 20. The converter 14 may be a bidirectional converter capable of changing an input and output direction thereof. If the battery system 20 is not being charged or discharged, operation of the converter 14 may be stopped, thereby minimizing or reducing power consumption.

The integrated controller 15 may monitor states of the power generation system 2, the power distribution system 3, the battery system 20, and the load 4. For example, the integrated controller 15 may monitor whether a power failure has occurred in the power distribution system 3, whether the power generation system 2 generates electric power, and an amount of generated electric power, a charge state of the battery system 20, a power consumption amount of the load 4, a time, and so forth.

The integrated controller 15 may control operations of the power conversion unit 11, the inverter 13, the converter 14, the battery system 20, the first switch 30, the second switch 40, and so forth according to a monitoring result and a predefined algorithm. For example, when a power failure occurs in the power distribution system 3, the integrated controller 15 may control the other components so that the electric power stored in the battery system 20 or the electric power generated by the power generation system 2 is supplied to the load 4. In addition, when sufficient electric power cannot be supplied to the load 4, the integrated controller 15 may determine priorities for electric devices of the load 4 and control the load 4 so that electric power is supplied to electric devices having the highest priorities. In addition, the integrated controller 15 may control charging or discharging of the battery system 20.

The first switch 30 and the second switch 40 are connected in serial between the inverter 13 and the power distribution system 3 and control a flow of a current between the power generation system 2 and the power distribution system 3 by being turned on and off under the control of the integrated controller 15. According to states of the power generation system 2, the power distribution system 3, and the battery system 20, the on and off states of the first switch 30 and the second switch 40 may be determined.

For example, if the electric power from at least one of the power generation system 2 and the battery system 20 is supplied to the load 4, or if the electric power from the power distribution system 3 is supplied to the battery system 20, the first switch 30 is in an on state. If the electric power from at least one of the power generation system 2 and the battery system 20 is supplied to the power distribution system 3, or if the electric power from the power distribution system 3 is supplied to at least one of the load 4 and the battery system 20, the second switch 40 is in an on state.

If a power failure occurs in the power distribution system 3, the second switch 40 is maintained in an off state, and the first switch 30 is maintained in an on state. That is, the electric power from at least one of the power generation system 2 and the battery system 20 is supplied to the load 4, and simultaneously the electric power supplied to the load 4 is prevented from flowing to the power distribution system 3. As described above, by operating the energy storage system 1 as a standalone system, an accident such that an electrician working on a power line of the power distribution system 3 receives an electric shock due to the electric power from the power generation system 2 or the battery system 20 may be prevented.

Each of the first switch 30 and the second switch 40 may include a switching device, such as a relay, capable of enduring or processing a high current.

The battery system 20 may receive and store the electric power from at least one of the power generation system 2 and the power distribution system 3 and may supply the stored electric power to at least one of the load 4 and the power distribution system 3. The charging and discharging of the battery system 20 may be controlled by the integrated controller 15. The battery system 20 is described in more detail with reference to FIG. 2.

Figure 2:
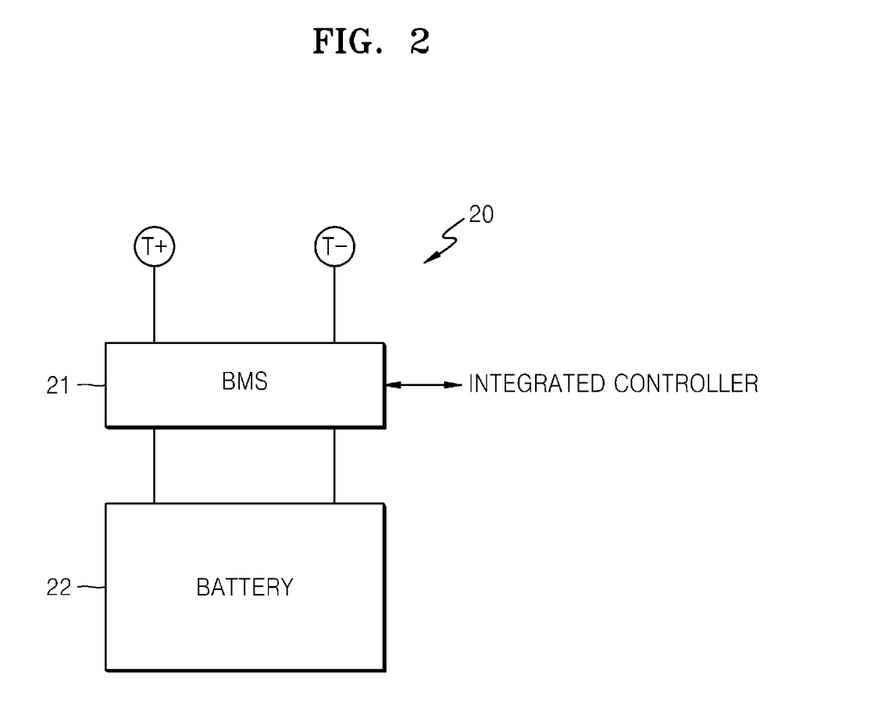
FIG. 2 is a block diagram of a battery system according to various embodiments.

FIG. 2 is a block diagram of the battery system 20 according to various embodiments of the present invention. Referring to FIG. 2, the battery system 20 may include a battery management system (BMS) 21 and a battery 22.

The BMS 21 is connected to the battery 22 and may control a general operation of the battery system 20 according to a control command or an internal algorithm of the integrated controller 15. For example, the BMS 21 may perform an overcharge protection function, an overdischarge protection function, an overcurrent protection function, an overvoltage protection function, an overheat protection function, a cell balancing function, and so forth.

The BMS 21 may store management threshold information for overcharge, overdischarge, overcurrent, overvoltage, overheat, cell balancing, and so forth. In particular, a management threshold of the cell balancing may be determined by an imbalancing margin or a cell balancing start voltage difference. In addition, the BMS 21 may measure and/or calculate a voltage, a current, a temperature, a remaining power capacity, a life span, a state of charge (SOC), and so forth of the battery 22. For example, the BMS 21 may measure a voltage, a current, and a temperature of the battery 22 by using sensors and calculate a remaining power capacity, a life span, an SOC, and so forth of the battery 22 based on the measured voltage and current. The BMS 21 may manage the battery 22 based on the management threshold information, the measurement result, and the calculation result.

For example, the BMS 21 may measure a temperature of the battery 22, and if the measured temperature of the battery 22 is greater than a predetermined threshold temperature, the BMS 21 may open connections to the input and output terminals T+ and T−. The BMS 21 may store the predetermined threshold temperature as management threshold information.

If any one of battery cells of the battery 22 has a greater cell voltage than the other battery cells by more than a predetermined threshold voltage, the BMS 21 may perform a cell balancing operation for discharging the battery cell having the greater cell voltage. The cell balancing is performed for the battery cells connected in serial to have the same charge state. For example, in some embodiments, if any one of the battery cells is fully discharged prior to the other battery cells, even though electrical energy remains in the other battery cells, the remaining electrical energy cannot be used. Accordingly, inefficiency occurs, and the cell balancing is performed to prevent this inefficiency.

When both old battery cells and new battery cells are included in the battery 22, even though the new battery cells and the old battery cells have the same charge state, voltages of the new battery cells may be greater than voltages of the old battery cells. If the cell balancing is performed based on cell voltages, the new battery cells may be discharged to decrease voltage levels of the new battery cells to voltage levels of the old battery cells. The discharging of the new battery cells may be unnecessary in that a charge state of the new battery cells may be lower than a charge state of the old battery cells in terms of the charge state. In addition, since the voltage levels of the new battery cells are greater than the voltage levels of the old battery cells, the cell balancing operation may be more frequently performed in a case where the new battery cells and the old battery cells are mixed than in a case where only the new battery cells or the old battery cells exist. Thus, a cell balancing threshold to be applied if only battery cells having similar degrees of use exist may be different from a cell balancing threshold to be applied to a case where battery cells having different degrees of use exist.

In the specification, the meaning of "old battery cell" or "new battery cell" is not necessarily related to an age of the battery cell, but may be related to factors representing a degree of use or wear, such as frequent or rare use cycle, a long or short use time, or an early or late manufacturing or installation date of the battery cell. As used herein, whether a battery cell is old or new or how old the battery cell is may be determined, for example, by a combination of various elements, such as a use cycle, a use time, a manufacturing date, and an installation date. In addition, in the specification, the term "degree of use" has substantially the same meaning as "how old" and may be determined by a use cycle, a use time, a manufacturing date, an installation date, and so forth, as described above. A use cycle of a battery cell indicates the number of charges and discharges of the battery cell.

For example, if old battery cells and new battery cells are mixed, for example, battery cells having different use cycles are used, an imbalancing margin may be wide. In addition, the cell balancing start voltage difference may be set to be large.

For example, if some deteriorated battery cells are replaced by new battery cells, a cell balancing may be delayed until voltage levels of the new battery cells in a full charge state have similar voltage levels as the existing old battery cells in a full charge state.

The cell balancing start voltage difference indicates a difference between a cell balancing threshold voltage and a cell balancing start voltage. When a voltage difference between a cell voltage of any one battery cell and the cell balancing threshold voltage is greater than the cell balancing start voltage difference, it may be determined for the battery cell that the cell balancing is to be performed. The cell balancing threshold voltage may be determined as, for example, the lowest cell voltage or a mean cell voltage in a group of battery cells.

The BMS 21 may store information regarding a cell balancing management threshold, i.e., information regarding an imbalancing margin or information regarding a cell balancing start voltage difference, for the battery cells of the battery 22. The cell balancing management threshold may vary according to a difference in degree of use of the battery cells of the battery 22. For example, when some deteriorated battery cells in the battery 22 are replaced by new battery cells, the battery 22 may include old battery cells and the new battery cells. A cell balancing management threshold to be applied to this case may be different from a cell balancing management threshold applied before the cell replacement.

For example, if the BMS 21 receives information from the integrated controller 15 indicating that certain battery cells have been replaced, the BMS 21 may modify the cell balancing management threshold. For example, the BMS 21 may change the cell balancing management threshold from 20 mV to 40 mV after receiving a battery cell replacement event indication. The BMS 21 may return the cell balancing management threshold to 20 mV if a predetermined time has elapsed since the battery cell replacement. The predetermined time may be a time representing a time for until voltage levels of the replaced battery cells in a full charge state to decrease to be similar to voltage levels of the existing battery cells in a full charge state. According to another embodiment, the BMS 21 may change the cell balancing management threshold to 30 mV after a first predetermined time has elapsed since the battery cell replacement and may change the cell balancing management threshold to 20 mV after a second predetermined time has elapsed since the change. That is, the BMS 21 may change a first threshold to a second threshold after receiving a battery cell replacement event and may gradually return from the second threshold to the first threshold according to the elapse of the predetermined time.

The BMS 21 may store information for determining degree of use of the battery cells of the battery 22. For example, the BMS 21 may store at least one of a use cycle, a total use time, a manufacturing date, and an installation date, of each of the battery cells of the battery 22. The BMS 21 may determine a degree of use of each battery cell based on the information regarding each battery cell. The BMS 21 may determine the cell balancing management threshold based on a difference between degree of use of the newest battery cell and the oldest battery cell among the battery cells of the battery 22. In addition, the BMS 21 may determine the cell balancing management threshold based on the degree of use of the newest battery cell among the battery cells of the battery 22 in addition to the difference between degrees of use of the newest battery cell and the oldest battery cell among the battery cells of the battery 22.

In addition, when old battery cells and new battery cells are mixed in the battery 22, the old battery cells and the new battery cells may be managed based on different thresholds. That is, the old battery cells and the new battery cells may be managed based on different thresholds according to degrees of use of the battery cells. For example, compared with the old battery cells, an imbalancing margin may be set wider for the new battery cells. In addition, compared with the old battery cells, a cell balancing start voltage difference may be set larger for the new battery cells. The cell balancing management threshold for the new battery cells may be more or less tolerant than a cell balancing management threshold for the old battery cells.

The BMS 21 may separately store the cell balancing management threshold for the old battery cells and the cell balancing management threshold for the new battery cells. The BMS 21 may store various cell balancing management thresholds determined according to a use cycle, a total use time, or a manufacturing date of a battery cell, or a combination thereof. In addition, to determine whether a battery cell is old or new, the BMS 21 may store at least one of an installation date and a manufacturing date of the battery cell. According to another embodiment, the BMS 21 may independently manage use cycles or total use times of battery cells.

The BMS 21 may determine whether each of the battery cells is old or new or determine a degree of use of each battery cell based on a use cycle, a total use time, an installation date, or a manufacturing date of each battery cell or a combination thereof. The BMS 21 may store cell balancing management thresholds differently determined according to degrees of use of the battery cells. The BMS 21 may store imbalancing margins differently determined according to degrees of use of the battery cells. In addition, the BMS 21 may store cell balancing start voltage differences differently determined according to degree of use of the battery cells.

The BMS 21 may provide a measurement result and a calculation result to the integrated controller 15 and receive a command related to a control of the battery 22 from the integrated controller 15. The BMS 21 may receive information regarding an installation date and/or a manufacturing date of the battery 22 from the integrated controller 15. When at least a portion of the battery cell is replaced, the BMS 21 may receive a control command for resetting and updating a use cycle and/or a total use time of the replaced battery cells to 0 from the integrated controller 15.

The battery 22 may include battery cells connected in serial, in parallel, or in a combination of serial and parallel to each other. The battery 22 may include wirings for connecting nodes of the battery cells to the BMS 21 to provide cell voltages of the battery cells to the BMS 21.

For example, the battery 22 may include a first battery cell and a second battery cell connected in serial to each other. The BMS 21 may have a first cell balancing management threshold and a second cell balancing management threshold that are different from each other, and may perform a cell balancing operation of the first battery cell based on the first cell balancing management threshold and perform a cell balancing operation of the second battery cell based on the second cell balancing management threshold. For example, the first cell balancing management threshold may be a cell balancing management threshold for old battery cells, and the second cell balancing management threshold may be a cell balancing management threshold for new battery cells. The cell balancing management threshold for new battery cells may be more relaxed than the cell balancing management threshold for old battery cells. The cell balancing management threshold may indicate a rule under which the cell balancing is performed. That is, according to the rule, the cell balancing of a battery cell may start when a voltage of the battery cell is greater than a sum of the cell balancing threshold voltage and the cell balancing start voltage difference.

In addition, the BMS 21 may have a first imbalancing margin and a second imbalancing margin that are different from each other. When a cell voltage of the first battery cell is within the first imbalancing margin, the cell balancing of the first battery cell may not be performed. When the first battery cell has a more frequent use cycle, a longer use time, an earlier installation or manufacturing date than the second battery cell, the second imbalancing margin may be wider than the first imbalancing margin.

For example, the cell balancing management threshold for an old battery cell may be determined so that the cell balancing is performed when a cell voltage of the old battery cell is greater than the minimum cell voltage of the battery cells of the battery 22 by a first voltage. The cell balancing management threshold for a new battery cell may be determined so that the cell balancing is performed when a cell voltage of the new battery cell is greater than the minimum cell voltage of the battery cells of the battery 22 by a second voltage. The second voltage may be greater than the first voltage. In this case, the minimum cell voltage of the battery cells of the battery 22 may be referred to as a cell balancing threshold voltage, and the first voltage and the second voltage may be referred to as cell balancing start voltage differences.

According to another embodiment, the cell balancing management threshold for an old battery cell may be determined so that the cell balancing is performed when a cell voltage of the old battery cell is greater than a mean cell voltage of the battery cells of the battery 22 by a third voltage. The cell balancing management threshold for a new battery cell may be determined so that the cell balancing is performed when a cell voltage of the new battery cell is greater than the mean cell voltage of the battery cells of the battery 22 by a fourth voltage. The fourth voltage may be greater than the third voltage. In this case, the mean cell voltage of the battery cells of the battery 22 may be referred to as a cell balancing threshold voltage, and the third voltage and the fourth voltage may be referred to as cell balancing start voltage differences.

The BMS 21 and the battery 22 may be included in a rack (not shown). In this case, the BMS 21 may be referred to as a rack BMS, and the battery 22 may be referred to as a rack battery.

FIG. 2 shows that the battery system 20 includes the BMS 21 and the battery 22. However, the battery system 20 may have a more complex structure. For example, the battery system 20 may include a plurality of racks, each rack including the BMS 21 and the battery 22.

Figure 3:
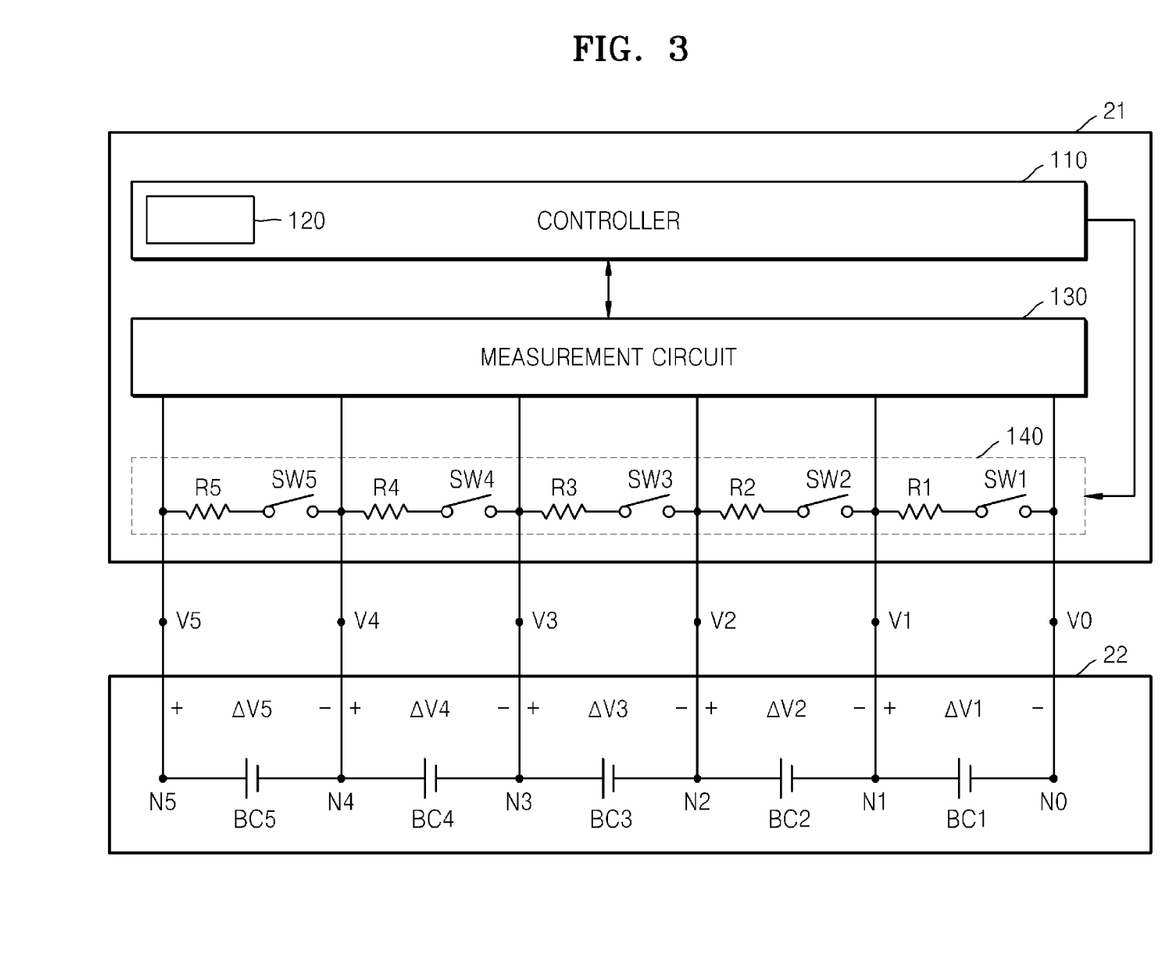
FIG. 3 is a block diagram of a battery management system (BMS) and a battery according to certain embodiments.

FIG. 3 is a block diagram of the BMS 21 and the battery 22 according to various embodiments. Referring to FIG. 3, the BMS 21 includes a controller 110, a storage unit 120, a measurement circuit 130, and a cell balancing circuit 140. The battery 22 includes a plurality of battery cells BC1 to BC5.

Although FIG. 3 shows that the battery 22 includes five battery cells BC1 to BC5 that are connected in serial to each other, this is only illustrative, and the battery 22 may include a more or fewer battery cells, and the battery cells may be connected in parallel or in a combination of parallel and serial. In addition, the battery 22 may include a plurality of battery modules (not shown). Each of the battery modules may include a plurality of battery cells connected in serial, in parallel, or in a combination of parallel and serial. In the description below, for the easy understanding, it is assumed that the battery 22 includes the five battery cells BC1 to BC5.

The first to fifth battery cells BC1 to BC5 may include a rechargeable secondary battery. For example, the first to fifth battery cells BC1 to BC5 may be based on nickel-cadmium technology, lead battery technology, nickel metal hydride (NiMH) technology, lithium-ion technology, lithium polymer technology, and so forth.

As shown in FIG. 3, the first to fifth battery cells BC1 to BC5 may be connected in serial. The cell balancing may be generally performed between battery cells connected in serial because the cell balancing is generally not necessary between battery cells connected in parallel. Thus, when the first to fifth battery cells BC1 to BC5 of the battery 22 are connected in a combination of serial and parallel, the cell balancing may be performed only between battery cells connected in serial. That is, when the first and second battery cells BC1 and BC2 are connected in serial, the third and fourth battery cells BC3 and BC4 are connected in serial, and the first and second battery cells BC1 and BC2 and the third and fourth battery cells BC3 and BC4 are connected in parallel, the cell balancing may be independently performed between the first and second battery cells BC1 and BC2 and between the third and fourth battery cells BC3 and BC4. However, according to another embodiment, even though the first and second battery cells BC1 and BC2 and the third and fourth battery cells BC3 and BC4 are connected in parallel, the cell balancing may be performed among the first to fourth battery cells BC1 to BC4.

The battery 22 includes first to sixth nodes N0 to N5. As shown in FIG. 3, the first node N0 is a cathode of the first battery cell BC1, the sixth node N5 is an anode of the fifth battery cell BC5, and the second to fifth nodes N1 to N4 are contact points between every two of the first to fifth battery cells BC1 to BC5. Voltages at the first to sixth nodes N0 to N5 may be represented by V0 to V5, respectively, and cell voltages of the first to fifth battery cells BC1 to BC5 may be represented by $\Delta V1$ to $\Delta V5$, respectively. Although a total voltage of the battery 22 is a difference between the voltage V0 at the first node N0 and the voltage V5 at the sixth node N5, i.e., V5-V0, the total voltage of the battery 22 may be represented by the voltage V5 at the sixth node N5 by assuming that the first node N0 is ground.

For the BMS 21 to obtain the cell voltages $\Delta V1$ to $\Delta V5$ and the total voltage V5 of the battery 22, wirings may be connected from the first to sixth nodes N0 to N5 to the measurement circuit 130 of the BMS 21. The controller 110 may measure the voltages V1 to V5 at the second to sixth nodes N1 to N5 with reference to the voltage V0 at the first node N0 by using the measurement circuit 130 and calculate the cell voltages $\Delta V1$ to $\Delta V5$ of the first to fifth battery cells BC1 to BC5. According to another embodiment, the controller 110 may measure the cell voltages $\Delta V1$ to $\Delta V5$ by using the measurement circuit 130 and obtain the total voltage V5 by accumulating the cell voltages $\Delta V1$ to $\Delta V5$.

The controller 110 may perform a cell balancing operation according to a cell balancing threshold stored in the storage unit 120. The cell balancing threshold is to discharge a battery cell having a greater cell voltage than the lowest cell voltage of the cell voltages $\Delta V1$ to $\Delta V5$ by a cell balancing start voltage difference. According to another embodiment, the cell balancing threshold is to discharge a battery cell having a greater cell voltage than a mean cell voltage of the cell voltages $\Delta V1$ to $\Delta V5$ by the cell balancing start voltage difference.

For example, if the cell voltages $\Delta V1$ to $\Delta V5$ are 4.180 V, 4.177 V, 4.199 V, 4.183 V, and 4.195 V, respectively, the lowest cell voltage is 4.177 V. If the cell balancing start voltage difference is 20 mV, the third battery cell BC3 having the cell voltage $\Delta V3$ of 4.199 V should be cell-balanced according to the cell balancing rule. Accordingly, the third battery cell BC3 may be discharged, and a cell balancing operation may be performed so that the cell voltage $\Delta V3$ of the third battery cell BC3 is below 4.197 V.

The controller 110 may perform the cell balancing operation by discharging a particular battery cell using the cell balancing circuit 140. The cell balancing circuit 140 may include first to fifth resistors R1 to R5 and first to fifth switches SW1 to SW5 connected in serial between the first to sixth nodes N0 to N5, respectively. The controller 110 may discharge a battery cell for which the cell balancing is necessary by shorting a switch connected in parallel to the battery cell for which the cell balancing is to be performed to form a closed circuit including a corresponding resistor. For example, in the above example, the controller 110 may short the third switch SW3 corresponding to the third battery cell BC3 to discharge the third battery cell BC3 through the third resistor R3, thereby decreasing the third cell voltage $\Delta V3$ to below 4.197 V.

According to another embodiment, when the cell balancing is performed for the third battery cell BC3, the cell voltage $\Delta V3$ of the third battery cell BC3 may decrease to less than a predetermined voltage. The predetermined voltage may be defined by a sum of a cell balancing threshold voltage and a cell balancing end voltage difference, and the cell balancing end voltage difference may vary according to a use cycle, a use time, a manufacturing date, an installation date, and so forth of a corresponding battery cell. For example, a cell balancing end voltage difference of an old battery cell may be 10 mV.

The first to fifth switches SW1 to SW5 may be formed of, for example, a Metal-Oxide-Semiconductor Field-Effect Transistor (MOSFET).

Although FIG. 3 suggests that the cell balancing circuit 140 performs the cell balancing by using a passive cell balancing method for discharging power of a battery cell having a relatively high charge state through a balancing resistor (i.e., a resistor), the present invention is not limited thereto. The cell balancing circuit 140 may perform the cell balancing by using an active cell balancing method for supplying power of a battery cell having a relatively high charge state to a battery cell having a relatively low charge state.

The cell balancing circuit 140 may individually perform the cell balancing for the first to fifth battery cells BC1 to BC5 or may perform the cell balancing by grouping a plurality of battery cells.

In the above example, the third battery cell BC3 and the fifth battery cell BC5 may be newer than the first, second, and fourth battery cells BC1, BC2, and BC4. As such, when old battery cells and new battery cells are mixed, the cell balancing threshold may be modified. That is, an imbalancing threshold may be set wide, or a cell balancing start voltage difference may be set large. In the current embodiment, the imbalancing threshold or the cell balancing start voltage difference may be changed from about 10 mV to about 30 mV. That is, the cell balancing threshold may be changed so that the cell balancing is performed if a cell voltage of a battery cell is greater than the lowest cell voltage among the cell voltages $\Delta V1$ to $\Delta V5$ by the imbalancing threshold e.g., 30 mV.

The storage unit 120 may store the cell balancing rule and/or the cell balancing threshold for the first to fifth battery cells BC1 to BC5. The cell balancing rule and/or the cell balancing threshold may be determined based on not only a difference between degrees of use of the newest and the oldest of the first to fifth battery cells BC1 to BC5 but also the degree of use of the newest battery cell.

In addition, in the above example, the third battery cell BC3 and the fifth battery cell BC5 may have greater output voltages than the first, second, and fourth battery cells BC1, BC2, and BC4 in the same charge state. In the above example, charge states of the third battery cell BC3 having the cell voltage $\Delta V3$ of 4.199 V and the fifth battery cell BC5 having the cell voltage $\Delta V5$ of 4.195 V may be similar to charge states of the first, second, and fourth battery cells BC1, BC2, and BC4. In this case, the cell balancing for the third battery cell BC3 or the fifth battery cell BC5 may be unnecessary. Thus, when old battery cells and new battery cells are mixed, different cell balancing management thresholds may be preferably applied according to degree of use of the battery cells. As described above, a cell balancing start voltage difference for an old battery cell may be referred to as a first cell balancing start voltage difference.

In the current embodiment, for the third battery cell BC3 and the fifth battery cell BC5, a cell balancing management threshold in which the cell balancing is performed if a cell voltage is greater than the lowest cell voltage among the cell voltages $\Delta V1$ to $\Delta V5$ by a second cell balancing start voltage difference, e.g., 30 mV, that is greater than the first cell balancing start voltage difference. That is, for new battery cells, whether the cell balancing is necessary may be determined with a more relaxed threshold than old battery cells. In the current embodiment, the second cell balancing start voltage difference indicates a cell balancing start voltage difference for a new battery cell.

The storage unit 120 may store a cell balancing management threshold for old battery cells and a cell balancing management threshold for new battery cells, where old and new battery cells is determined based on a degree of use threshold of a factor representing a degree of use. For example, the storage unit 120 may store a cell balancing start voltage difference for the old battery cells and a cell balancing start voltage difference for the new battery cells. The storage unit 120 may store a threshold for distinguishing the old battery cells and the new battery cells and data of the battery cells. For example, the storage unit 120 may store a use cycle, a use time, an installation date, or a manufacturing date of each battery cell, or a combination of them. The storage unit 120 may store an internal algorithm of the controller 110. The storage unit 120 may include a nonvolatile memory.

The controller 110 may have a threshold for distinguishing whether each battery cell is old or new. For example, a user may mark on each battery cell about whether each battery cell is old or new, and the controller 110 may determine based on the mark of the user whether a corresponding battery cell is old. The user may mark on the first to fifth battery cells BC1 to BC5 through the integrated controller 15, and the integrated controller 15 may transmit marking data of the user to the controller 110. Alternatively, the user may directly mark on each battery cell stored in the storage unit about whether each battery cell is old or new, through the controller 110.

According to another embodiment, data of an installation date of each battery cell may be stored in the storage unit 120. When the battery system 20 is installed, when the battery 22 is added, or when a deteriorated battery cell is replaced by a new battery cell, the user may record an installation date of each battery cell in the storage unit 120. An installation date may be recorded in a unit of a battery cell, a battery module, a battery tray, a battery rack, or a battery pack according to a replaced or newly installed unit. The user may input an installation date through the integrated controller 15, and the integrated controller 15 may transmit the data to the BMS 21. Alternatively, the user may access the controller 110 to directly input an installation date of each battery cell to the storage unit 120. A manufacturing date of each battery cell may be stored in the storage unit 120.

The controller 110 may determine whether a battery cell is new or old, based on a difference between a current date and an installation date. According to another embodiment, the controller 110 may determine a degree of use of a battery cell based on a difference between a current date and an installation date. For example, 30 days or less since the battery cell was used may be determined that the degree of use is in a first stage. In addition, 100 days or less since the battery cell was used may be determined that the degree of use is in a second stage. In addition, 1 year or less since the battery cell was used may be determined that the degree of use is in a third stage. In addition, 3 years or less since the battery cell was used may be determined that the degree of use is in a fourth stage. In addition, over 3 years since the battery cell was used may be determined that the degree of use is in a fifth stage.

In this case, cell balancing management thresholds according to stages of a degree of use may be stored in the storage unit 120. For example, a cell balancing start voltage difference for battery cells in the fifth stage may be 10 mV, a cell balancing start voltage difference for battery cells in the fourth stage may be 15 mV, a cell balancing start voltage difference for battery cells in the third stage may be 20 mV, a cell balancing start voltage difference for battery cells in the second stage may be 25 mV, and a cell balancing start voltage difference for battery cells in the first stage may be 30 mV.

According to another embodiment, a relational equation between differences between a current date and an installation date and cell balancing start voltage differences may be defined, and a cell balancing start voltage difference determined by the relational equation may be used.

According to another embodiment, data of a use cycle of each battery cell may be stored in the storage unit 120. When the battery system 20 is installed, when the battery 22 is added, or when a deteriorated battery cell is replaced by a new battery cell, the user may reset the use cycle of a corresponding battery cell to 0. The controller 110 may record a use cycle of a battery cell in the storage unit 120.

The controller 110 may determine a degree of use of each battery cell based on a use cycle of the battery cell. For example, when the use cycle is less than 100 times, a corresponding battery cell may be determined as a new battery cell. According to another embodiment, the controller 110 may determine a degree of use of each battery cell based on a use cycle of the battery cell. In addition, different cell balancing management thresholds according to degrees of use may be stored in the storage unit 120. In addition, a relational equation between use cycles of a battery cell and cell balancing start voltage differences may be defined, and a cell balancing start voltage difference determined by the relational equation may be used.

According to another embodiment, data of a use time of each battery cell may be stored in the storage unit 120. When the battery system 20 is installed, when the battery 22 is added, or when a deteriorated battery cell is replaced by a new battery cell, the user may reset the use time of a corresponding battery cell to 0. The controller 110 may record a use time of a battery cell till the present in the storage unit 120. If a deteriorated battery cell is replaced by a used battery cell, the user may record a use time of the used battery cell in the storage unit 120.

The controller 110 may determine a degree of use of each battery cell based on a use time of the battery cell. For example, when the use time is less than 1000 hours, a corresponding battery cell may be determined as a new battery cell. According to another embodiment, the controller 110 may determine a degree of use of each battery cell based on a use time of the battery cell. In addition, different cell balancing management thresholds according to degrees of use may be stored in the storage unit 120. In addition, a relational equation between use times of a battery cell and cell balancing start voltage differences may be defined, and a cell balancing start voltage difference determined by the relational equation may be used.

In the description below, basic information for determining whether each battery cell is old or new, i.e., a use cycle, a use time, an installation date, a manufacturing date, and so forth of each battery cell, may be referred to as use information or degree of use of each battery cell. In addition, all of the quantitative values suggested in the above examples are illustrative and do not limit the present invention.

In the above description, although it has been described that use information and voltages of the first to fifth battery cells BC1 to BC5 are considered in the cell balancing rule for determining whether the cell balancing of the first to fifth battery cells BC1 to BC5 is performed, this is for the ease of explanation. The cell balancing rule may be more complex. For example, a state of charge (SOC) may be considered for the cell balancing rule.

The controller 110 may calculate SOCs of the first to fifth battery cells BC1 to BC5 from a measurement result of the measurement circuit 130. The controller 110 may detect open-circuit voltages of the first to fifth battery cells BC1 to BC5 and calculate the SOCs of the first to fifth battery cells BC1 to BC5 from data indicating the open-circuit voltages and the SOCs. The storage unit 120 may store a data table showing relationships between the open-circuit voltages and the SOCs. However, a method of calculating the SOCs of the first to fifth battery cells BC1 to BC5 is not limited to the method of calculating the SOCs of the first to fifth battery cells BC1 to BC5 from the open-circuit voltages. For example, various methods of calculating the SOCs, such as a current accumulating method, may be used.

Figure 4:
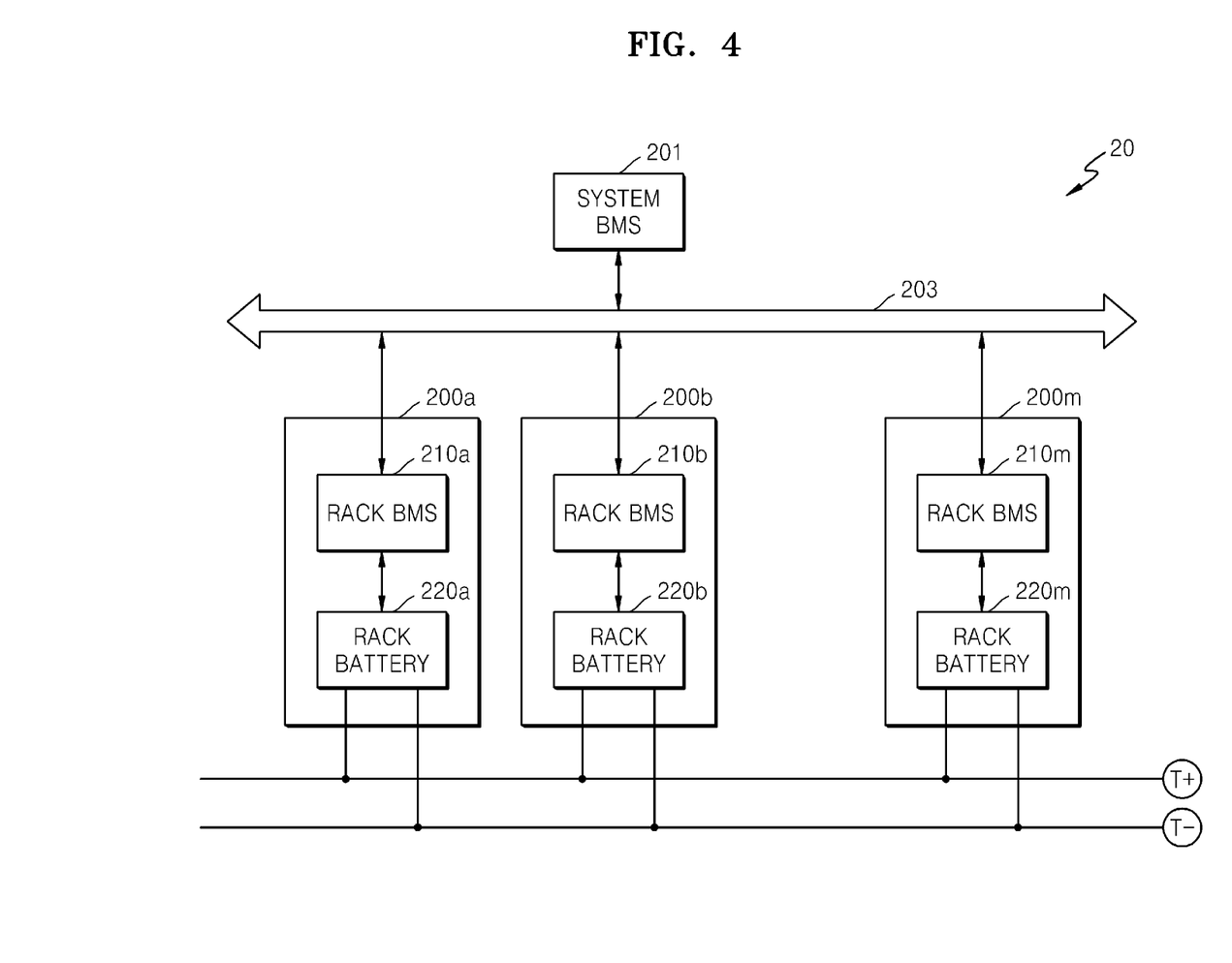
FIG. 4 is a block diagram of a battery system according to various embodiments.

FIG. 4 is a block diagram of the battery system 20 according to various embodiments. Referring to FIG. 4, the battery system 20 may include a system BMS 201, a plurality of racks 200a to 200m, and a first bus 203 for data communication. The plurality of racks 200a to 200m may include a plurality of rack BMSs 210a to 210m and a plurality of rack batteries 220a to 220m, respectively. In the description below, the plurality of racks 200a to 200m, the plurality of rack BMSs 210a to 210m, and the plurality of rack batteries 220a to 220m may be referred to as a rack 200, a rack BMS 210, and a rack battery 220, respectively, for convenience of description.

FIG. 4 shows a case where the battery system 20 includes the plurality of racks 200a to 200m. The rack BMS 210 and the rack battery 220 in the rack 200 may correspond to the BMS 21 and the battery 22 shown in FIG. 3, respectively.

The system BMS 201 may control a general operation of the battery system 20. The system BMS 201 may transmit a command for controlling the plurality of racks 200a to 200m to the plurality of corresponding rack BMSs 210a to 210m according to a control command or an internal algorithm of the integrated controller 15. For example, the system BMS 201 may transmit a command for controlling on/off states of the plurality of racks 200a to 200m to the plurality of corresponding rack BMSs 210a to 210m. In addition, the system BMS 201 may command the plurality of rack BMSs 210a to 210m to transmit data obtained by measuring states of the plurality of rack batteries 220a to 220m. The system BMS 201 may receive the data of the states of the plurality of rack batteries 220a to 220m, e.g., a temperature, an output voltage, an output current, and so forth, from the plurality of rack BMSs 210a to 210m and transmit the received data to the integrated controller 15.

The system BMS 201 and the plurality of rack BMSs 210a to 210m may form a master-slave system as shown in FIG. 4. The system BMS 201 may control the plurality of rack BMSs 210a to 210m, and the plurality of rack BMSs 210a to 210m may perform various types of processing based on the control of the system BMS 201. According to another embodiment, the system BMS 201 may be omitted, and a first rack BMS 210a, which performs the function of the system BMS 201, may control a general operation of the battery system 20. For example, the first rack BMS 210a may control the other rack BMSs 210b to 210m, and the other rack BMSs 210b to 210m may perform various types of processing based on the control of the first rack BMS 210a. In this case, the first rack BMS 210a may also perform processing on a first rack battery 220a.

The rack battery 220 may store electric power from at least one of the power generation system 2 and the power distribution system 3 and may supply the stored electric power to at least one of the power distribution system 3 and the load 4. The rack battery 220 may include at least one tray connected in serial, in parallel, or in a combination of serial and parallel. Although FIG. 4 shows that the plurality of rack batteries 220a to 220m are connected in parallel, the plurality of rack batteries 220a to 220m may be connected in serial or in a combination of serial and parallel according to the requirement of the battery system 20.

The rack BMS 210 may monitor a state of the rack battery 220, e.g., a temperature, a voltage, a current, and so forth, and measure data. The rack BMS 210 may control a cell balancing operation of battery cells included in the rack battery 220 according to the measured data or a predetermined algorithm. When the plurality of rack batteries 220a to 220m are connected in serial, the cell balancing may be performed for the battery cells included in the plurality of rack batteries 220a to 220m. In this case, the system BMS 201 may collect data of all the battery cells and control a cell balancing operation, and the plurality of rack BMSs 210a to 210m may, for example, passively perform a cell balancing operation according to a control command of the system BMS 201.

The rack BMS 210 may transmit the measured data to the system BMS 201 via the first bus 203, and the system BMS 201 may transmit a command for performing a predefined or specific operation to the rack BMS 210 via the first bus 203. The first bus 203 is a path between the system BMS 201 and the plurality of rack BMSs 210a to 210m to transmit data or a command therethrough. The first bus 203 may be a Controller Area Network (CAN) bus. However, the first bus 203 is not limited thereto, and all proper communication protocols for transmitting data or a command through a bus may be applicable.

The configuration of the battery system 20 shown in FIG. 4 is illustrative. Although it has been described in FIG. 4 that the system BMS 201 and the plurality of rack BMSs 210a to 210m communicate with each other using the first bus 203, the present invention is not limited thereto. For example, the system BMS 201 and the plurality of rack BMSs 210a to 210m may be connected in serial to each other to transmit data or a command between the system BMS 201 and the plurality of rack BMSs 210a to 210m that are close to each other. In this case, only any one specific rack BMS, e.g., the first rack BMS 210a, can communicate with the system BMS 201.

Figure 5:
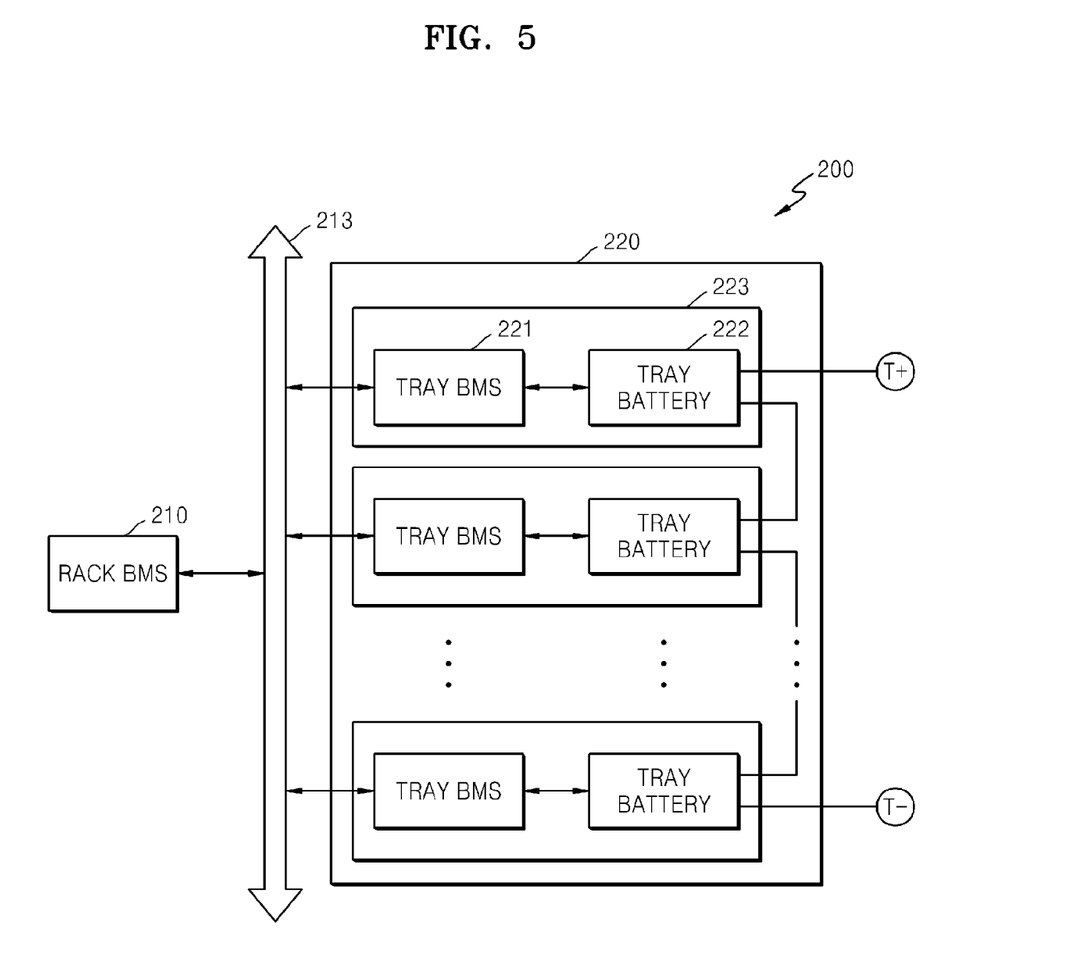
FIG. 5 is a block diagram of a rack according to various embodiments.

FIG. 5 is a block diagram of the rack 200 according to various embodiments. Referring to FIG. 5, the rack 200 may include the rack BMS 210, a plurality of battery trays 223, and a second bus 213 for data communication.

The battery trays 223 are in a lower layer of the rack 200 and may store electric power and supply the stored electric power to the power distribution system 3 and the load 4. Each of the plurality of battery trays 223 may include a tray BMS 221 and a tray battery 222.

The tray battery 222 stores electric power and may include a plurality of battery cells connected in serial, in parallel, or in a combination of serial and parallel to each other. The number of battery cells included in the tray battery 222 may be determined according to a required output voltage.

The tray battery 222 may include at least one battery module, which may be connected in serial, in parallel, or in a combination of serial and parallel to each other. The battery module may include a plurality of battery cells connected in serial, in parallel, or in a combination of serial and parallel to each other. The battery module may consist of battery cells connected in serial and may be a unit of replacement for convenience of management. That is, a deteriorated battery module may be replaced by a new battery module. The tray battery 222 may be referred to as a battery module.

The tray BMS 221 may control a cell balancing operation for the battery cells included in the tray battery 222. The tray battery 222 may be similar to the battery 22 of FIG. 3.

The tray BMS 221 may monitor a state of the tray battery 222, e.g., a temperature, a voltage, a current, and so forth, and transmit the measured data to the rack BMS 210. In addition, the tray BMS 221 may perform the cell balancing of the tray battery 222 in response to a cell balancing control command of the rack BMS 210.

The measurement circuit 130 and the cell balancing circuit 140 of FIG. 3 may be included in the tray BMS 221. In addition, the controller 110 and the storage unit 120 of FIG. 3 may be included in the rack BMS 210. The tray BMS 221 may measure or calculate cell voltages of the battery cells by using the measurement circuit 130. The tray BMS 221 may transmit the measured or calculated cell voltages of the battery cells to the rack BMS 210. The rack BMS 210 may determine a battery cell for which the cell balancing needs to be performed, based on use information, the cell voltages, and a cell balancing management threshold of the battery cells, which are stored in the storage unit 120. The rack BMS 210 may transmit information regarding the determined battery cell for which the cell balancing is to be performed to the tray BMS 221, and the tray BMS 221 may perform a cell balancing operation by discharging the battery cell by using the cell balancing circuit 140.

FIG. 5 shows that all the tray batteries 222 are connected in serial. If all battery cells in the plurality of tray batteries 222 are connected in serial, it may be suitable that the rack 200 that is a configuration in an upper layer of the plurality of battery trays 223 is in charge of control of the cell balancing. In this case, the control of the cell balancing may be performed by the rack BMS 210. That is, the controller 110 of FIG. 3 may be included in the rack BMS 210.

However, the control of the cell balancing may be performed by the tray BMS 221. That is, the controller 110 of FIG. 3 may be included in the tray BMS 221. For example, when the plurality of tray batteries 222 are connected in parallel, the cell balancing may be performed for only battery cells in each tray battery 222. Thus, the tray BMS 221 may be in charge of control of the cell balancing for the tray battery 222 and determine a battery cell for which the cell balancing is to be performed. In this case, the description of the tray BMS 221 may refer to the description of the BMS 21 of FIG. 3.

The second bus 213 is a path between the rack BMS 210 and the plurality of tray BMSs 221 to transmit data or a command therethrough. CAN communication may be used between the rack BMS 210 and the plurality of tray BMSs 221. However, the first bus 203 is not limited thereto, and all communication protocols for transmitting data or a command through a bus may be applicable.

Figure 6:
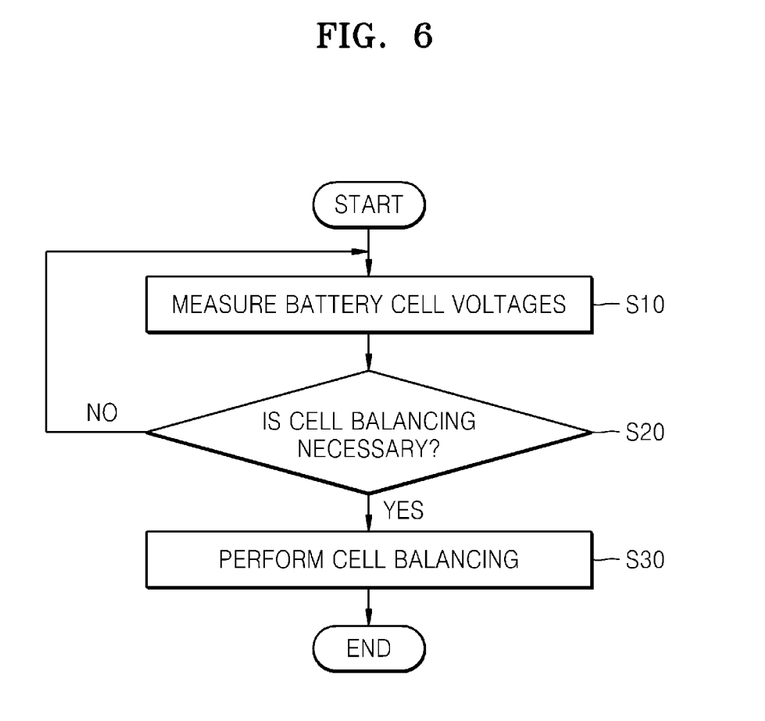
FIG. 6 is a flowchart illustrating a battery cell balancing method according to various embodiments.

FIG. 6 is a flowchart illustrating a battery cell balancing method according to various embodiments.

Referring to FIGS. 3 and 6, in operation S10, the controller 110 measures cell voltages of battery cells by using the measurement circuit 130.

Based on the cell voltages of the battery cells, the controller 110 determines in operation S20 whether cell balancing is to be performed. Whether the cell balancing is performed is determined according to a cell balancing management threshold stored in the storage unit 120. According to an embodiment, at least two cell balancing management thresholds may be stored in the storage unit 120. For example, the storage unit 120 may store a cell balancing management threshold to be applied when old battery cells and new battery cells are mixed and a cell balancing management threshold to be applied when only old battery cells or new battery cells exist. The storage unit 120 may store a plurality of cell balancing management thresholds different according to degrees of use of battery cells. The plurality of different cell balancing management thresholds may be determined according to a difference between a degree of use of the oldest battery cell and a degree of use of the newest battery cell and/or the degree of use of the newest battery cell.

The cell balancing management threshold may include a cell balancing threshold voltage and a cell balancing start voltage difference. The cell balancing threshold voltage may be defined by a minimum cell voltage, a mean cell voltage, an intermediate cell voltage, or the like of a group of battery cells. The cell balancing start voltage difference may vary according to a difference between degrees of use of battery cells. For example, a cell balancing start voltage difference to be applied when old battery cells and new battery cells are mixed may be greater than a cell balancing start voltage difference to be applied when battery cells having similar degrees of use exist. The degree of use of a battery cell is used as the term indicating whether the battery cell is old or new or how old the battery cell is.

The cell balancing management threshold may include a cell balancing end voltage difference. The cell balancing end voltage difference may also vary according to a difference between degree of use of the battery cells.

According to another embodiment, at least two cell balancing management thresholds may be stored in the storage unit 120. For example, the storage unit 120 may store a cell balancing management threshold for old battery cells and a cell balancing management threshold for new battery cells. According to another embodiment, a plurality of cell balancing management thresholds different according to degrees of use of battery cells may be stored in the storage unit 120.

The cell balancing start voltage difference may be based on degree of use of battery cells. For example, a cell balancing start voltage difference for old battery cells may be lower than a cell balancing start voltage difference for new battery cells. The cell balancing management threshold may include a cell balancing end voltage difference. The cell balancing end voltage difference may also be based on degree of use of battery cells.

The storage unit 120 may store data for distinguishing degrees of use of battery cells. For example, the storage unit 120 may store information regarding a use cycle, a use time, an installation date, or a manufacturing date of each battery cell, or a combination of them. The controller 110 may determine a degree of use of each battery cell in consideration of a use cycle, a use time, an installation date, and/or a manufacturing date of the battery cell. In addition, the controller 110 may read a cell balancing management threshold corresponding to the degree of use from the storage unit 120 and determine based on the read cell balancing management threshold whether the battery cell needs the cell balancing.

If it is determined that the cell balancing is not to be performed, the controller 110 measures cell voltages of the battery cells again by using the measurement circuit 130. If it is determined that the cell balancing is to be performed, the controller 110 performs the cell balancing of the battery cell for which the cell balancing is to be performed by using the cell balancing circuit 140 in operation S30.

Certain non-limiting features and aspects have been described with reference to the figures. For conciseness of the specification, disclosure of conventional electronic configurations, control systems, software, and other functional aspects of the systems may be omitted. In addition, connections or connection members of lines between components shown in the drawings illustrate functional connections and/or physical or circuit connections, and the connections or connection members can be represented by replaceable or additional various functional connections, physical connections, or circuit connections in an actual apparatus. In some alternative embodiments, certain features and aspects may be omitted.

The use of the term "said" or a similar term in the specification (in particular, in the claims) may correspond to both the singular and the plural. In addition, the ranges disclosed in the discussion above, include the individual values belonging to the ranges. For steps forming the methods described, the steps can be performed in an order not specifically described. The use of all illustrations or illustrative terms (e.g. for example, and so forth, etc.) in is simply to describe the inventive aspects and principles, and the scope of the present invention is not limited by the illustrations or illustrative terms. In addition, it will be understood by those of ordinary skill in the art that various modifications, combinations, and changes can be made. Therefore, the present invention should not be limited to and defined by the embodiments described above.

What is claimed is:

1. A battery management system, configured to manage a battery comprising first and second battery cells, the battery management system comprising:
a measurement circuit, configured to determine a parameter of each of the battery cells; and
a controller configured to determine whether to balance the battery cells based at least in part on the determined parameter and a factor representing a degree of use of each of the battery cells, wherein the controller is further configured to balance the battery cells based on whether the battery cells are to be balanced.

2. The battery management system of claim 1, wherein the parameter comprises a voltage.

3. The battery management system of claim 1, wherein the parameter comprises a state of charge (SOC).

4. The battery management system of claim 1, wherein the factor representing the degree of use of each of the battery cells comprises at least one of a use cycle, a use time, an installation date, or a manufacturing date of each battery cell.

5. The battery management system of claim 1, wherein the determination of whether to balance the battery cells is based at least in part on whether a first difference of a value of the parameter for the first battery cell and a value of the parameter for of the second battery cell is greater than a magnitude of a threshold, wherein the magnitude of the threshold is based on a magnitude of a second difference between the degree of use of the first battery cell and the degree of use of the second battery cell.

6. The battery management system of claim 5, wherein the magnitude of the threshold is greater if the magnitude of the second difference is greater.

7. The battery management system of claim 5, further comprising a storage unit configured to store the threshold.

8. The battery management system of claim 1, wherein the determination of whether to balance the battery cells is based at least in part on whether a first difference of a value of the parameter for the first battery cell and a value of the parameter for of the second battery cell is greater than a magnitude of a threshold, wherein the magnitude of the threshold is based on whether the factors for the first and second battery cells is greater than a degree of use threshold.

9. The battery management system of claim 1, further comprising a storage unit configured to store a rule, wherein the determination of whether the battery cells are to be balanced is determined based on the rule.

10. The battery management system of claim 9, wherein the rule is based on the determined parameter and the degree of use factor.

11. A battery management system, configured to manage a battery comprising first and second battery trays, the battery management system comprising:
a measurement circuit, configured to determine a parameter of each of the battery trays; and
a controller configured to determine whether to balance the battery trays based at least in part on the determined parameter and a factor representing a degree of use of each of the battery trays, wherein the controller is further configured to balance the battery trays based on whether the battery trays are to be balanced.

12. The battery management system of claim 11, wherein the parameter comprises a voltage.

13. The battery management system of claim 11, wherein the parameter comprises a state of charge (SOC).

14. The battery management system of claim 11, wherein the factor representing the degree of use of each of the battery trays comprises at least one of a use cycle, a use time, an installation date, or a manufacturing date of each battery tray.

15. The battery management system of claim 11, wherein the determination of whether to balance the battery trays is based at least in part on whether a first difference of a value of the parameter for the first battery tray and a value of the parameter for of the second battery tray is greater than a magnitude of a threshold, wherein the magnitude of the threshold is based on a magnitude of a second difference between the degree of use of the first battery tray and the degree of use of the second battery tray.

16. The battery management system of claim 15, wherein magnitude of the threshold is greater if the magnitude of the second difference is greater.

17. The battery management system of claim 15, further comprising a storage unit configured to store the threshold.

18. The battery management system of claim 11, wherein the determination of whether to balance the battery trays is based at least in part on whether a first difference of a value of the parameter for the first battery tray and a value of the parameter for of the second battery tray is greater than a magnitude of a threshold, wherein the magnitude of the threshold is based on whether the factors for the first and second battery trays is greater than a degree of use threshold.

19. The battery management system of claim 11, further comprising a storage unit configured to store a rule, wherein the determination of whether the battery trays are to be balanced is determined based on the rule.

20. The battery management system of claim 19, wherein the rule is based on the determined parameter and the degree of use factor.

* * * * *